United States Patent [19]
Kondo

[11] Patent Number: 5,175,667
[45] Date of Patent: Dec. 29, 1992

[54] GAS INSULATED SUBSTATIONS
[75] Inventor: Kazumasa Kondo, Amagasaki, Japan
[73] Assignee: Mitsubishi Denki Kabushiki Kaisha, Tokyo, Japan
[21] Appl. No.: 727,404
[22] Filed: Jul. 9, 1991
[30] Foreign Application Priority Data
  Jul. 11, 1990 [JP] Japan .................. 2-186320
[51] Int. Cl.⁵ .............................. H02B 5/00
[52] U.S. Cl. .................. 361/333; 361/341; 361/361
[58] Field of Search ............ 361/332, 333, 335, 341, 361/361

[56] References Cited
U.S. PATENT DOCUMENTS

| 4,428,027 | 1/1984 | Ohyama et al. | |
| 4,651,255 | 3/1987 | Suzuyama et al. | 361/341 |
| 4,745,522 | 5/1988 | Mitomo et al. | 361/341 |
| 4,899,250 | 2/1990 | Itai. | |
| 5,001,599 | 3/1991 | Itou et al. | 361/335 |

OTHER PUBLICATIONS

Anonymous, Publication No. CH-HS 135487E, p. 4, published by BBC in Apr., 1987.

Primary Examiner—Gregory D. Thompson
Attorney, Agent, or Firm—Burns, Doane, Swecker & Mathis

[57] ABSTRACT

Gas insulated substation mainly used for a power transmission system or a sub-station system, of which outgoing bus bar is shortened to reduce consumption of the outgoing bus bar. Gas insulated substation of the present invention comprising a circuit breaker, disconnecting switches, a ground switch, external equipment having an outgoing portion to be connected to the above equipment, and an outgoing bus bar vertically inclined to the outgoing portion of the external equipment.

4 Claims, 4 Drawing Sheets

GAS INSULATED SUBSTATIONS

BACKGROUND OF THE INVENTION

1. Field of the Invention

The present invention relates to gas insulated substations for switching electric circuits in a power transmission system or a sub-station system.

2. Description of the Prior Art

FIG. 3 shows a configuration of conventional gas insulated substation which is described in a paper published by BBC in April, 1987, of which publication No. is CH-HS 111487. FIG. 4 is a single line diagram of the system including the gas insulated substation shown in FIG. 3. In the figure, reference numeral 1 shows a circuit breaker and 2 denotes disconnecting switches, 3 a ground switch, 4 a bus bar connected to other circuits in a gas insulated substation, 5 a transformer arranged out of the gas insulated substation, 6 an outgoing portion of the transformer, 7 an outgoing bus bar. The outgoing bus bar 7 includes horizontal portion 7a and vertical portion 7b for connecting the gas insulated substation to the outgoing portion 6 of the transformer 5.

In the gas insulated substation as described above, current flowing into the gas insulated substations through the bus bar 4 flows into the transformer 5 through the disconnecting switch 2, the circuit breaker 1, the other disconnecting switch 2, and the outgoing portion 6 of the transformer 5.

When grounding is required for inspection, etc., the ground switch adjacent to the inspected portion is closed for grounding. The outgoing bus bar 7 is arranged along two sides at right angles to each other, for example, horizontal portion 7a and vertical portion 7b as shown in FIG. 3, since the outgoing bus bar is generally installed by a crane.

The conventional gas insulated substation described above has a drawback that the outgoing bus bar 7 connecting the gas insulated substations and the transformer becomes long, resulting in poor economy due to the increase in the amount of the outgoing bus bar.

SUMMARY OF THE INVENTION

It is therefore an object of the present invention to provide economical gas insulated substations through reduction in the length of the bus bar which connects the gas insulated substations and external equipment to each other.

The outgoing bus bar of the present invention is vertically inclined to an outgoing portion of the external equipment, which reduces the length of the bus bar for connecting the switch with external equipment. As a result, consumption of the bus bar is able to be reduced.

DETAILED DESCRIPTION OF PREFERRED EMBODIMENTS

Figure 1:
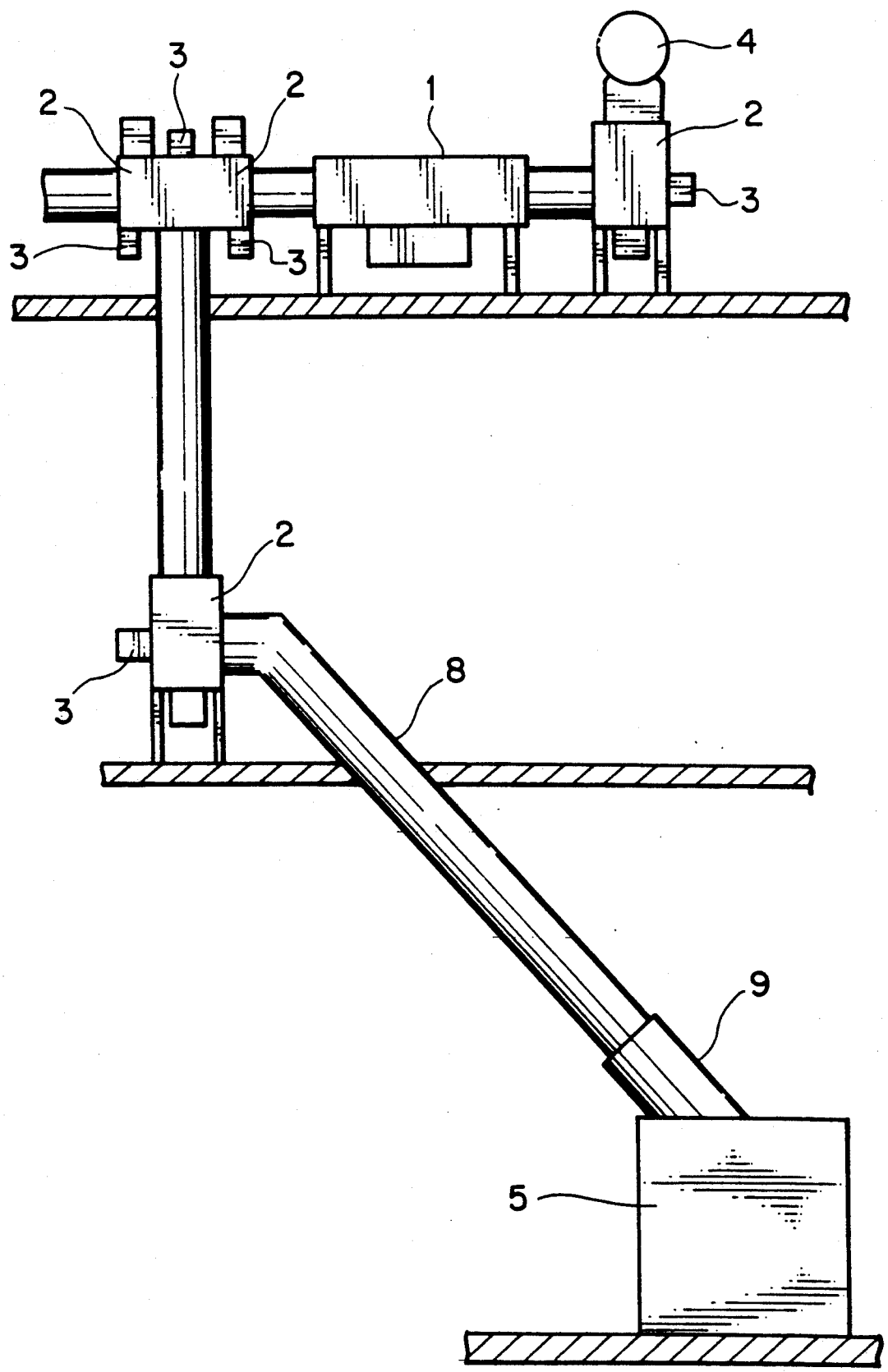
FIG. 1 is an elevational view of a gas insulated substation according to one embodiment of the present invention.

A gas insulated substation as an embodiment of the present invention is described in FIG. 1. In the figure, a circuit breaker 1, disconnecting switches 2, a ground switch 3, a bus bar 4, and a transformer 5 are arranged in the same manner as a conventional system described in FIG. 3. Denoted 8 is an outgoing bus bar for electrically connecting the gas insulated substation and the transformer 5 to each other. The outgoing bus bar 8 is vertically inclined to an outgoing portion described below. Denoted 9 is an outgoing portion of the transformer 5 being arranged in accordance with the extending direction of the outgoing bus bar.

Figure 3:
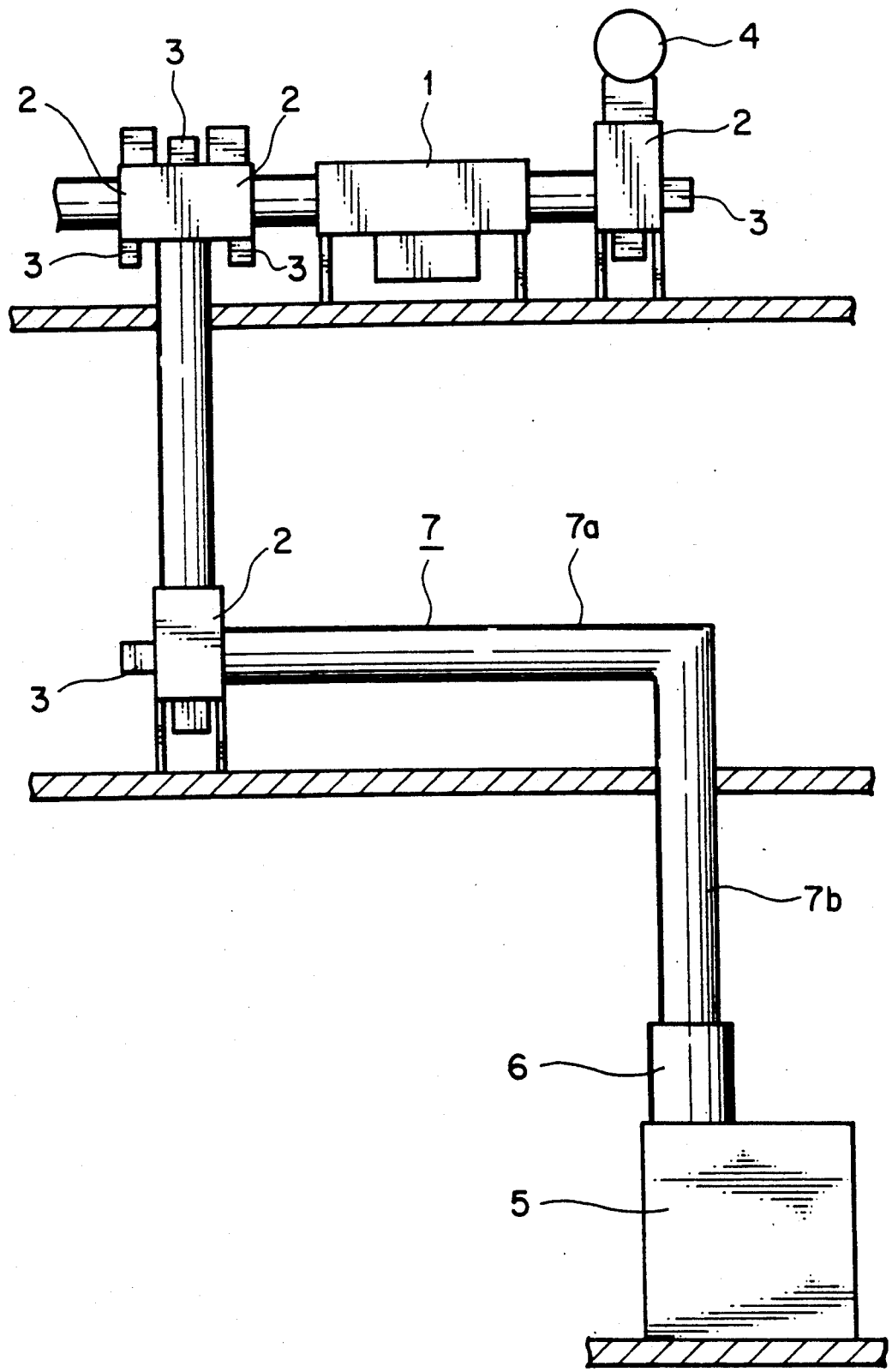
FIG. 3 shows a configuration of a conventional gas insulated substation.
Figure 4:
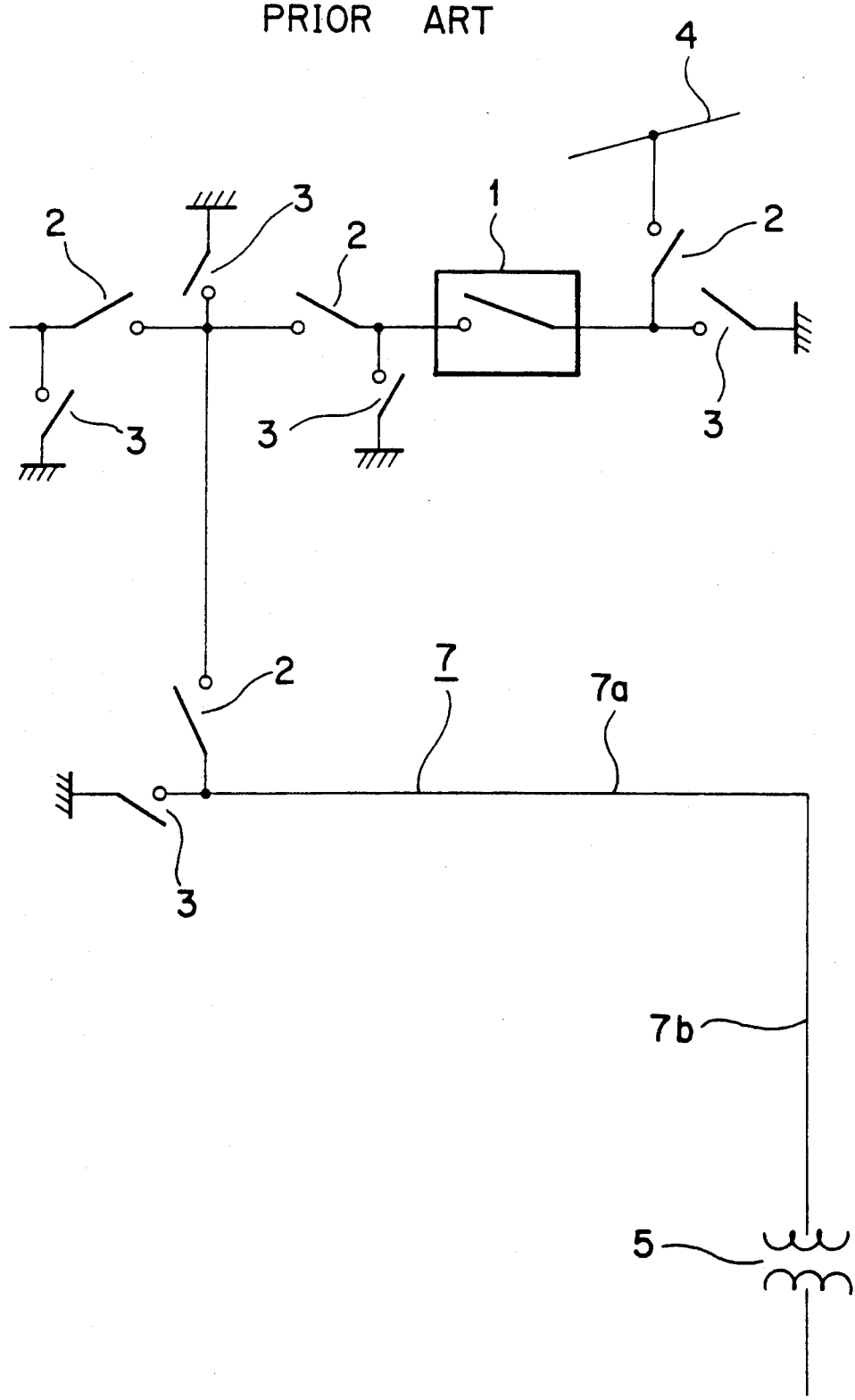
FIG. 4 shows a single line diagram of the system including the gas insulated substation described in FIG. 3.

In the gas insulated substations with the above configuration, current flowing into the bus bar 4 from other circuits through a bus bar 4, flows into the transformer 5 through the disconnecting switch 2, the circuit breaker 1, the other disconnection switch 2, and the outgoing bus bar 8, in the same manner as the conventional system shown in FIG. 3. Since the outgoing bus bar 8 is arranged to be vertically inclined to the outgoing portion 9, considerable reduction in consumption of the bus bar is able to be achieved in comparison to the conventional outgoing bus bar shown in FIG. 3. Moreover, erection work for the gas insulated substation of the present invention becomes easier than that of the conventional system because the direction of the outgoing portion 9 is arranged in accordance with the extending direction of the outgoing bus bar 9. Inclined outgoing bus bar 8 may cause somewhat difficult erection work for the bus bar with a crane as used in a conventional system. However, rollers may be used for erection work. The difficulty in the erection work is a small matter because consumption of the outgoing bus bar 8 is considerably reduced.

Figure 2:
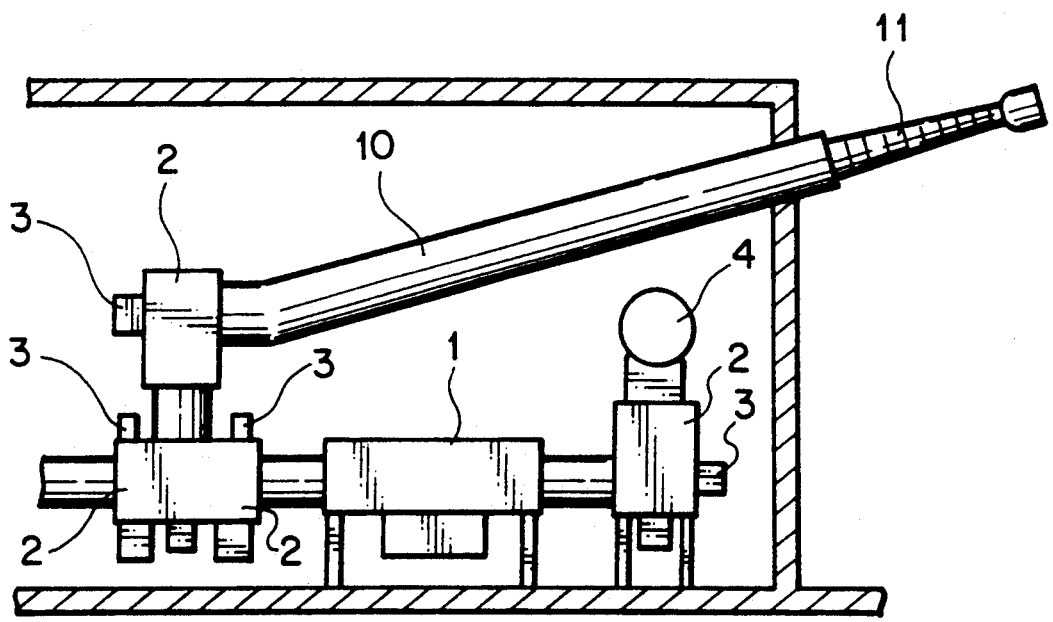
FIG. 2 is an elevational view of a gas insulated substation according to another embodiment of the present invention.

FIG. 2 shows another gas insulated substation of the present invention. The gas insulated substation shown in the figure is connected through the outgoing bus bar to a bushing in air 11, which is located out of the switch. Therefore, in this embodiment also, the outgoing bus bar 10 is arranged to be vertically inclined to the bushing in air 11, resulting in considerable amount of reduction in consumption of the bus bar.

Although, in the above embodiment, the transformer 5 and bushing in air 11 are applied as external equipment, a bushing in gas connected to a cable may be applied and provides the same effect as described in the above embodiment.

What is claimed is:

1. Gas insulated substation comprising:

a circuit breaker;

at least one disconnecting switch connected in series with said circuit breaker;

a ground switch connected in shunt with a series combination of said circuit breaker and said disconnecting switch, said circuit breaker, said disconnecting switch, and said ground switch being disposed inside an external wall of said gas insulated substation;

external equipment having a connecting portion to be connected to said series combination; and an outgoing bus bar extending at an oblique angle away from said series combination through said external wall to the connecting portion of the external equipment.

2. Gas insulated substation as claimed in claim 1, wherein said connecting portion of said external equipment is vertically inclined to be connected to the outgoing bus bar of the gas insulated substation.

3. Gas insulated substation as claimed in claim 1, wherein said external equipment includes a transformer.

4. Gas insulated substation as claimed in claim 1, wherein said external equipment includes a bushing in air.

* * * * *